C. F. BETTMANN.
TROLLEY WHEEL.
APPLICATION FILED AUG. 31, 1911.
1,050,094.
Patented Jan. 14, 1913.
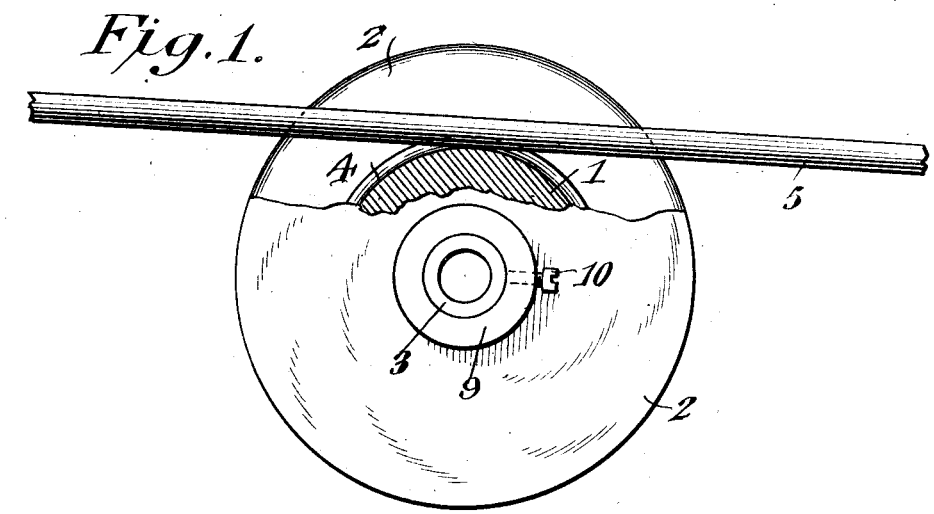
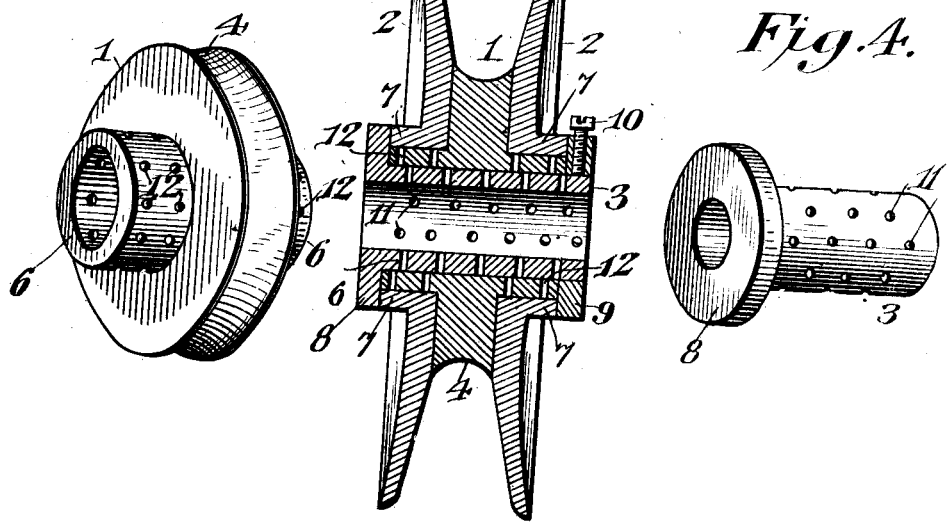
Witnesses
Jas. K. M°Cathran
John N. Giggers
Charles F. Bettmann
Inventor
By C. G. Giggers
Attorney

UNITED STATES PATENT OFFICE.

CHARLES FREDRICK BETTMANN, OF NEW ALBANY, INDIANA.

TROLLEY-WHEEL.

1,050,094.　　　　　Specification of Letters Patent.　　Patented Jan. 14, 1913.

Application filed August 31, 1911. Serial No. 647,108.

*To all whom it may concern:*

Be it known that I, CHARLES F. BETTMANN, a citizen of the United States, residing at New Albany, in the county of Floyd and State of Indiana, have invented a new and useful Trolley-Wheel, of which the following is a specification.

The invention relates to improvements in trolley wheels.

The object of the present invention is to improve the construction of trolley wheels, and to provide a simple, inexpensive and efficient trolley wheel, in which the parts which contact with the trolley wire will be capable of rotary movement independently of one another and also of the hub or bearing, whereby the friction and wear will be reduced to a minimum, and the trolley wheel prevented from rapidly heating.

A further object of the invention is to provide a trolley wheel of this character, which will enable ready access to be had to any of its parts, and in which any of the latter may be easily replaced when worn.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a side elevation of a trolley wheel, constructed in accordance with this invention, and partly broken away to show the central section or pulley. Fig. 2 is a central transverse sectional view. Fig. 3 is a detail perspective view of the central or pulley section. Fig. 4 is a detail perspective view of the hub.

Like numerals of reference designate corresponding parts in all the figures of the drawing.

In the accompanying drawing in which is illustrated the preferred embodiment of the invention, the trolley wheel comprises in its construction a central or pulley section 1, side disks 2, and a bearing hub 3 on which the central or pulley section is rotatably mounted. The central or pulley section 1 is provided with a grooved periphery 4 to receive the trolley wire 5, as clearly illustrated in Fig. 1 of the drawing, and it has a central opening and is provided at opposite sides at the opening with laterally projecting tubular bearing extensions 6 upon which the side disks 2 are rotatably mounted. The side disks 2, which are provided with central openings to receive the tubular extensions 6, have imperforate annular flanges 7, extending outwardly and forming continuations of the walls of the openings to increase the bearing surfaces of the side disks. The side disks which are spaced from the tubular hub by the said tubular extension 6, have inner central parallel portions to fit against the side faces of the central or pulley section, and their outer portions are flared outwardly, as clearly illustrated in Fig. 2 of the drawing. The outer end edges of the annular flanges 7 of the side disks are arranged in flush relation with the end edges of the tubular bearing extensions 6 of the central or pulley section of the trolley wheel.

The hub 3, which passes through the central opening of the central or pulley section 1, consists of a sleeve having a central bore or opening, and is provided at one end with an annular flange 8, forming a head and providing an abutment for both the central or pulley section and the adjacent side disk 2, the peripheral edge of the flange or head 8 being preferably arranged in flush relation with the outer face of the annular flange 7. The other end of the hub projects beyond the central or pulley section and the annular flange of the adjacent side disk, and it receives a set collar 9, having a clamping screw 10 and adapted to retain the central or pulley section and the side disks in their assembled relation. The clamping screw 10, which is mounted in a threaded perforation of the set collar, engages the hub and detachably secures the set collar thereon.

The hub 3 and the tubular bearing extensions 6 are provided with perforations 11 and 12, adapted to receive oil and graphite for lubricating the parts. The perforations 11 and 12 permit the lubricant to pass from the shaft (not shown) to the side disk, and the imperforate annular flanges 7 of the latter cover the perforations of the tubular extensions of the central section and prevent waste of the lubricant. The hub, which rotates on the axle or bolt of the trolley head, forms a bearing for the central or pulley construction, which is capable of free rotation on the hub independently thereof, and the side disks are capable of free rotary movement on the tubular bearing extensions of the central or pulley section and rotate independently of each other and also of the said central or pulley section. This is especially advantageous in preventing wear when a car is rounding a curve. The independent rotation of the hub and the central or pulley section is also adapted to reduce the wear to a minimum and prevents rapid heating of the trolley wheel. By removing the set collar, the parts of the trolley wheel may be readily separated, and any worn part may be quickly replaced. By having the flanges formed by the side disks 2 working independently of each other, the trolley wheel is prevented from dragging off the trolley wire when a car is going around a curve.

Having thus fully described my invention, what I claim as new and desire to secure by Letters Patent, is:—

1. A trolley wheel including a tubular hub adapted to be arranged on the shaft or axle of a trolley head, a central or pulley section provided with a central opening to receive the tubular hub and having central tubular bearing extensions projecting from the side faces of the said section and arranged on the end portions of the tubular hub, side disks fitted against the side faces of the central or pulley section and provided with central openings receiving the tubular bearing extensions, which space the disks from the tubular hub, said disks being capable of rotary movement independent of each other and also independently of the said central or pulley section, and means located at the ends of the tubular hub for retaining the central or pulley section and the side disks in place.

2. A trolley wheel including a central or pulley section having a central opening and provided at opposite sides with tubular bearing extensions having lubricant receiving perforations, side disks also provided with central openings and mounted for in-ing the perforations of the tubular exten- opening of the central or pulley section and having imperforate annular flanges covering the perforations of the tubular exten- forming a bearing on which the said central opening of the central or pulley section and forming a bearing on which the said central section is adapted to rotate, said hub having perforations and provided at one end with a flange forming a head, and a collar mounted on the other end of the hub, said head and collar loosely and detachably retaining the parts in assembled relation and permitting the side disks to rotate independently of each other and of the central section.

In testimony, that I claim the foregoing as my own, I have hereto affixed my signature in the presence of two witnesses.

CHARLES FREDRICK BETTMANN.

Witnesses:
 CHAS. HENRY SWIFT,
 JOHN D. SANDS, Jr.

Copies of this patent may be obtained for five cents each, by addressing the "Commissioner of Patents, Washington, D. C."

1,050,094 rotation on the hub independently thereof, and the side disks are capable of free rotary movement on the tubular bearing extensions of the central or pulley section and rotate independently of each other and also of the said central or pulley section. This is especially advantageous in preventing wear when a car is rounding a curve. The independent rotation of the hub and the central or pulley section is also adapted to reduce the wear to a minimum and prevents rapid heating of the trolley wheel. By removing the set collar, the parts of the trolley wheel may be readily separated, and any worn part may be quickly replaced. By having the flanges formed by the side disks 2 working independently of each other, the trolley wheel is prevented from dragging off the trolley wire when a car is going around a curve.

Having thus fully described my invention, what I claim as new and desire to secure by Letters Patent, is:—

1. A trolley wheel including a tubular hub adapted to be arranged on the shaft or axle of a trolley head, a central or pulley section provided with a central opening to receive the tubular hub and having central tubular bearing extensions projecting from the side faces of the said section and arranged on the end portions of the tubular hub, side disks fitted against the side faces of the central or pulley section and provided with central openings receiving the tubular bearing extensions, which space the disks from the tubular hub, said disks being capable of rotary movement independent of each other and also independently of the said central or pulley section, and means located at the ends of the tubular hub for retaining the central or pulley section and the side disks in place.

2. A trolley wheel including a central or pulley section having a central opening and provided at opposite sides with tubular bearing extensions having lubricant receiving perforations, side disks also provided with central openings and mounted for ining the perforations of the tubular extenopening of the central or pulley section and having imperforate annular flanges covering the perforations of the tubular extenforming a bearing on which the said central opening of the central or pulley section and forming a bearing on which the said central section is adapted to rotate, said hub having perforations and provided at one end with a flange forming a head, and a collar mounted on the other end of the hub, said head and collar loosely and detachably retaining the parts in assembled relation and permitting the side disks to rotate independently of each other and of the central section.

In testimony, that I claim the foregoing as my own, I have hereto affixed my signature in the presence of two witnesses.

CHARLES FREDRICK BETTMANN.

Witnesses:
 CHAS. HENRY SWIFT,
 JOHN D. SANDS, Jr.

Copies of this patent may be obtained for five cents each, by addressing the "Commissioner of Patents, Washington, D. C."

---

Correction in Letters Patent No. 1,050,094.

It is hereby certified that in Letters Patent No. 1,050,094, granted January 14, 1913, upon the application of Charles Fredrick Bettmann, of New Albany, Indiana, for an improvement in "Trolley-Wheels," an error appears in the printed specification requiring correction as follows: Page 2, strike out lines 43–64, comprising claim numbered 2, and insert the following:

2. A trolley wheel including a central or pulley section having a central opening and provided at opposite sides with tubular bearing extensions having lubricant receiving perforations, side disks also provided with central openings and mounted for independent rotation on the tubular extensions of the central or pulley section and having imperforate annular flanges covering the perforations of the tubular extensions, a hub extending through the central opening of the central or pulley section and forming a bearing on which the said central section is adapted to rotate, said hub having perforations and provided at one end with a flange forming a head, and a collar mounted on the other end of the hub, said head and collar loosely and detachably retaining the parts in assembled relation and permitting the side disks to rotate independently of each other and of the central section.

And that the said Letters Patent should be read with this correction therein that the same may conform to the record of the case in the Patent Office.

Signed and sealed this 25th day of March, A. D., 1913.

[SEAL.]

C. C. BILLINGS,
*Acting Commissioner of Patents.*

It is hereby certified that in Letters Patent No. 1,050,094, granted January 14, 1913, upon the application of Charles Fredrick Bettmann, of New Albany, Indiana, for an improvement in "Trolley-Wheels," an error appears in the printed specification requiring correction as follows: Page 2, strike out lines 43-64, comprising claim numbered 2, and insert the following:

2. A trolley wheel including a central or pulley section having a central opening and provided at opposite sides with tubular bearing extensions having lubricant receiving perforations, side disks also provided with central openings and mounted for independent rotation on the tubular extensions of the central or pulley section and having imperforate annular flanges covering the perforations of the tubular extensions, a hub extending through the central opening of the central or pulley section and forming a bearing on which the said central section is adapted to rotate, said hub having perforations and provided at one end with a flange forming a head, and a collar mounted on the other end of the hub, said head and collar loosely and detachably retaining the parts in assembled relation and permitting the side disks to rotate independently of each other and of the central section.

And that the said Letters Patent should be read with this correction therein that the same may conform to the record of the case in the Patent Office.

Signed and sealed this 25th day of March, A. D., 1913.

[SEAL.] C. C. BILLINGS,
*Acting Commissioner of Patents.*